No. 755,418. PATENTED MAR. 22, 1904.
K. VÖLLER.
RECOIL BRAKE FOR GUNS.
APPLICATION FILED JAN. 4, 1904.
NO MODEL. 6 SHEETS—SHEET 1.
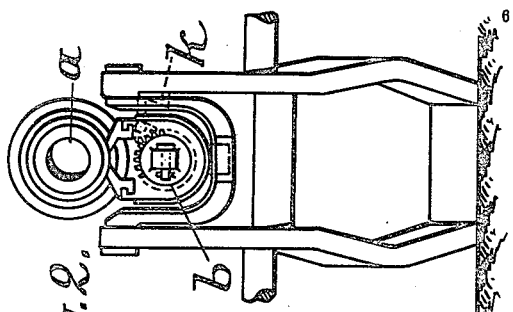
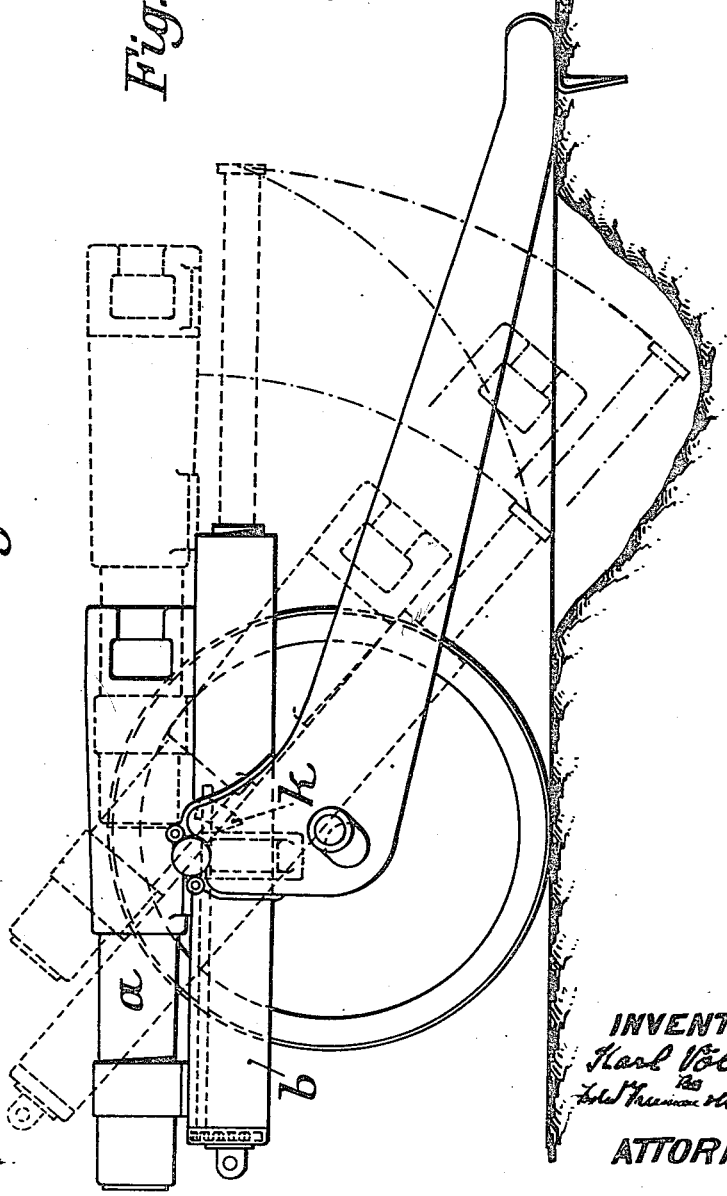
WITNESSES
INVENTOR
Karl Völler
ATTORNEYS No. 755,418. PATENTED MAR. 22, 1904.
K. VÖLLER.
RECOIL BRAKE FOR GUNS.
APPLICATION FILED JAN. 4, 1904.
NO MODEL. 6 SHEETS—SHEET 2.
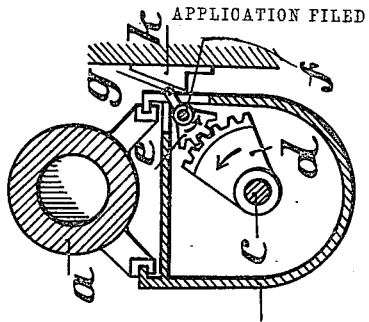
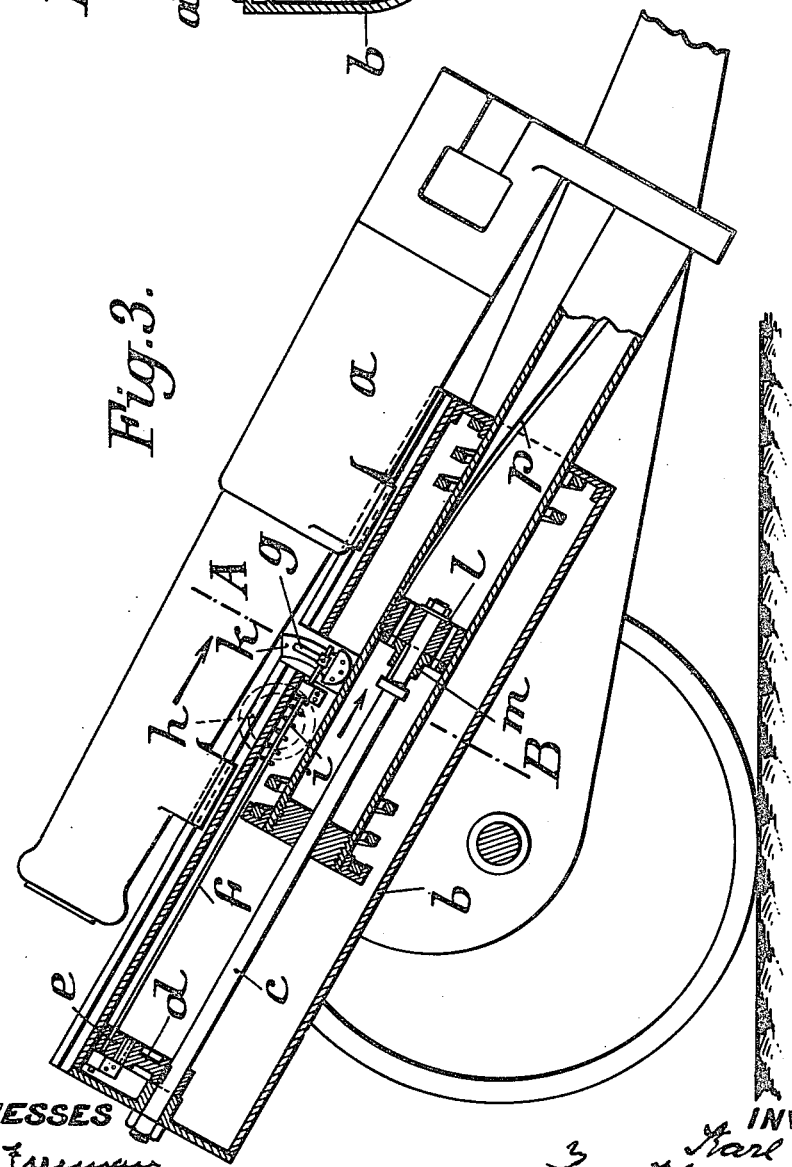
WITNESSES
INVENTOR
Karl Völler
ATTORNEYS

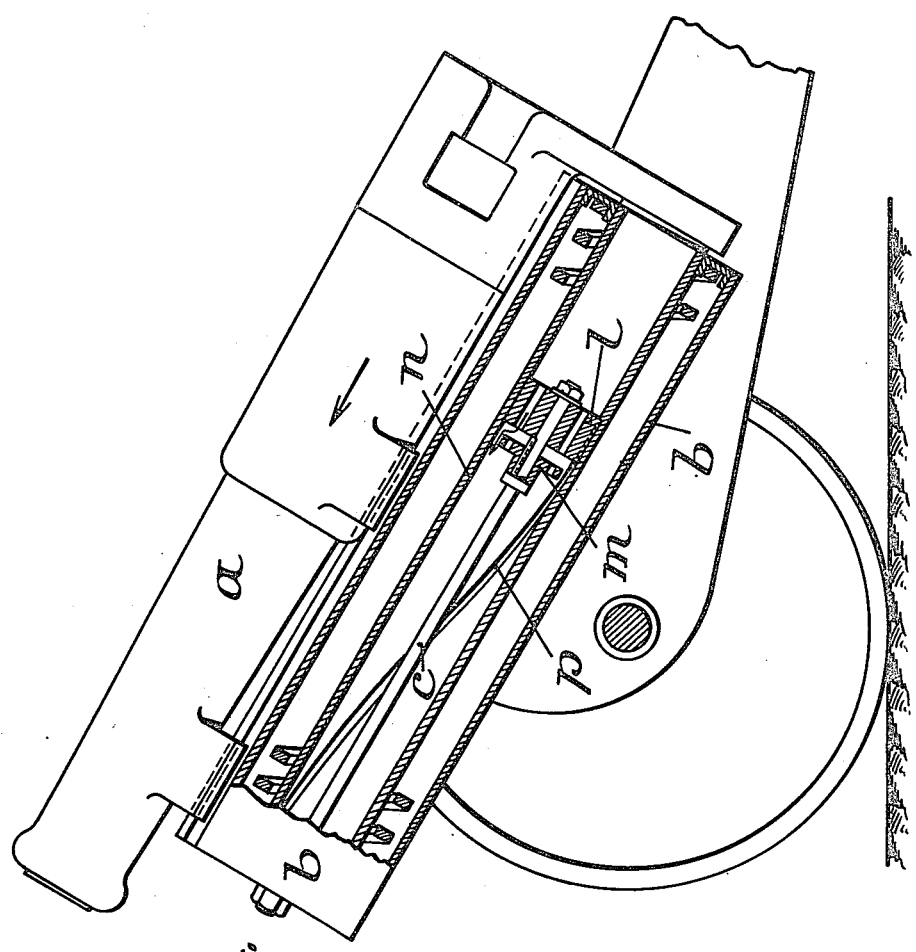

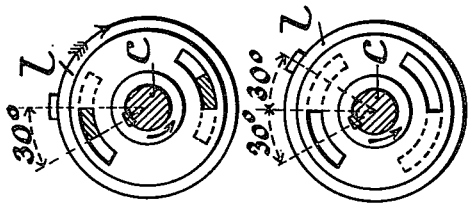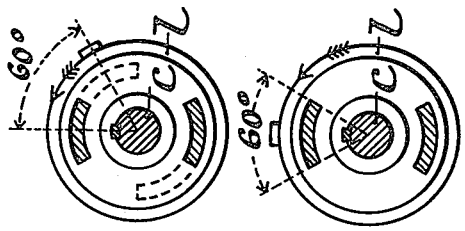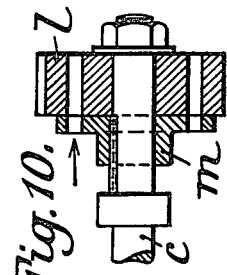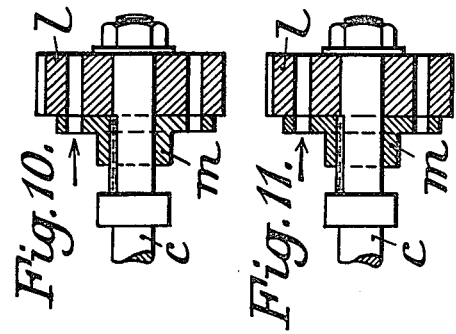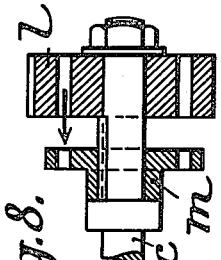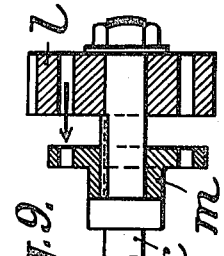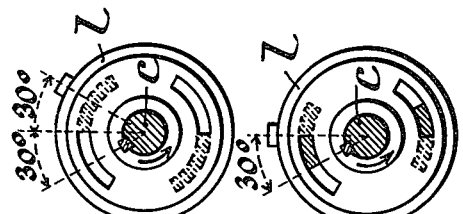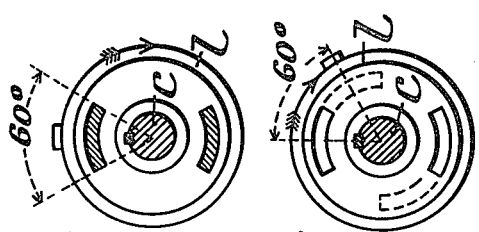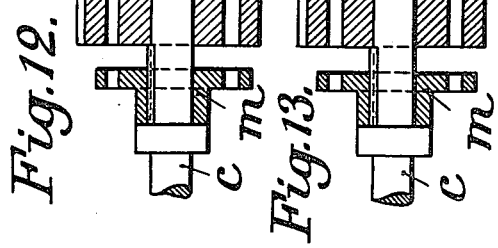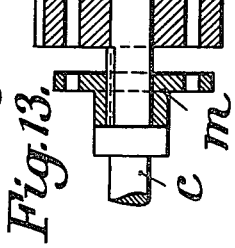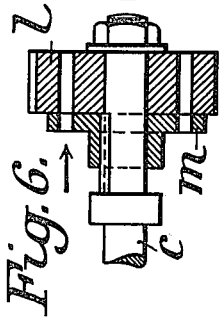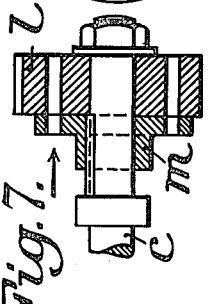

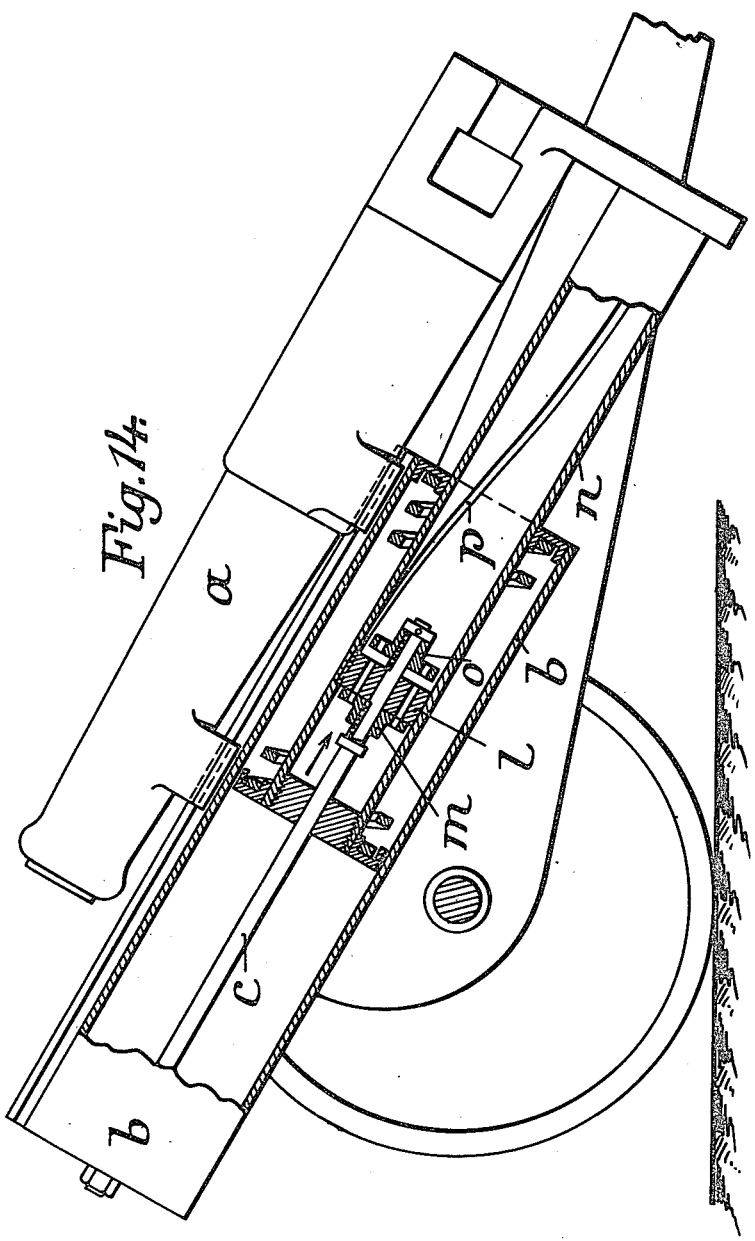

No. 755,418. PATENTED MAR. 22, 1904.
K. VOLLER.
RECOIL BRAKE FOR GUNS.
APPLICATION FILED JAN. 4, 1904.
NO MODEL. 6 SHEETS—SHEET 6.
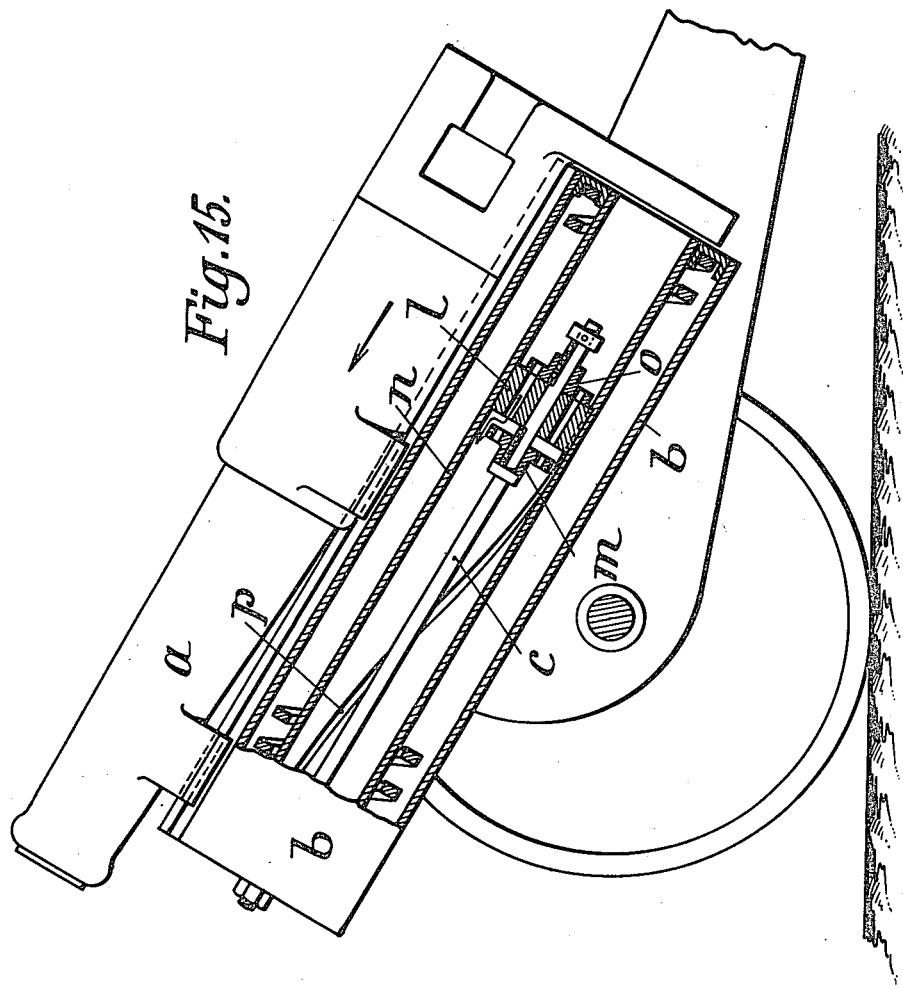

No. 755,418.

Patented March 22, 1904.

UNITED STATES PATENT OFFICE.

KARL VÖLLER, OF DUSSELDORF, GERMANY.

RECOIL-BRAKE FOR GUNS.

SPECIFICATION forming part of Letters Patent No. 755,418, dated March 22, 1904.

Application filed January 4, 1904. Serial No. 187,727. (No model.)

*To all whom it may concern:*

Be it known that I, KARL VÖLLER, engineer, a subject of the German Emperor, residing at 47 Jülicherstrasse, Dusseldorf, Germany, have invented certain new and useful Improvements in Recoil-Brakes for Guns; and I do hereby declare the following to be a full, clear, and exact description of the invention, such as will enable others skilled in the art to which it appertains to make and use the same.

This invention relates to recoil-brakes for guns in which the recoil of the gun proper on its mounting is braked by hydraulic apparatus. If with such guns an elevation is imparted to the gun—that is to say, the gun is turned upward upon its trunnions—then in addition to the work which has to be performed by the braking in consequence of the recoil after firing the further work has to be done which arises from the fact that the gun in recoiling runs down an inclined plane. In guns which are only liable to a slight inclination—as, for instance, any ordinary field-guns—it is taken into consideration that this further work of the gun in recoiling is compensated for by an extension of the recoil. The braking apparatus is consequently in this case made so long that on firing with an elevation the recoil of the gun can be of a more extended length than when firing in a horizontal position. With guns that have to be fired with considerable elevation—as, for instance, with howitzers—no correspondingly long gun recoil can be employed, and care has to be taken to insure that after a certain degree of elevation the length of the gun recoil decreases, because otherwise the gun when elevated could only effect its recoil up to the end if a trench had previously been formed in the ground. In order to avoid this, consequently the gun recoil must be shortened with increasing elevation. According to the present invention this is effected automatically by so arranging the brake apparatus that the orifices through which the braking liquid passes from the one side of the piston to the other on the recoil are automatically reduced to a certain degree with a definite elevation as compared with their sectional area when the gun is in horizontal position. In addition the said orifices are also subject to a variation of the sectional area during the recoil of the gun, being reduced from the initial amount determined by the elevation down to a certain minimum according to a determined law, which minimum is reached the sooner the smaller is the initial sectional area—that is to say, the greater the elevation is. The complete coming to rest of the gun recoil will therefore take place the sooner the greater the elevation is. If now the forward motion of the gun were to be started with the said minimum size of the orifices, increased resistance, due to the reduced size of such orifices, would be the more prejudicial, as the said orifices do not enlarge to the full with an elevation, but only to the said initial size determined by the elevation, although just with an elevation the forward-motion mechanism not only has to overcome the sliding friction, but also a component of the weight of the gun. In order to obviate the disadvantages arising herefrom, the present invention has a further effect that immediately on the commencement of the forward motion a large opening is provided for the flow of the braking fluid, and this without reference to the size of the openings during the recoil. By this means it is rendered possible to cause the termination of the recoil to take place at a perfectly-determined point, the said openings for the braking fluid being entirely closed at a certain point of the recoil whether the gun be in the horizontal position or at a certain elevation.

On the accompanying drawings are shown several arrangements for carrying out the said invention.

Figure 1 shows a side view of a recoil-howitzer constructed according to this invention. Fig. 2 shows a back view of the howitzer. Fig. 3 is a longitudinal section through the upper carriage of the braking mechanism with a certain elevation. Fig. 4 shows a similar section with another position of the parts. Fig. 5 is a sectional view on line A B, Fig. 3. Figs. 6 to 13 show diagrammatically the variations in the flow-orifices of the brake-piston during the recoil and during the forward motion, Figs. 6 to 9 show the action with a horizontal position of the gun; and Figs. 10 to 13 show the same with an elevation of thirty 100 degrees, Figs. 14 and 15 showing longitudinal sections with different positions of the parts through a brake mechanism in which also the forward motion is subject to regulation according to the elevation.

On the drawings, the gun proper is designated by $a$, the upper carriage $b$, and the brake-piston rod $c$. The piston-rod is fixed at its front end to the upper carriage, and the brake-cylinder, which is fixed to the gun, projects beyond the upper carriage on the recoil of the gun. In Fig. 1 the extent of recoil corresponding to the horizontal position of the gun sufficient for bringing it into the position of rest is shown in dotted lines. There is also shown the position of the gun and the upper carriage with a high elevation. It will be seen that if the gun when in this position on firing had the same extent of recoil as shown in dotted lines the end of the brake-cylinder and of the gun could only run back freely if in the first instance a hole had been dug out in the ground. The gun recoil must therefore be shortened for the elevated position, as show in dotted lines of the elevated position at Fig. 1.

As will be seen from Figs. 3 to 5, the piston-rod $c$ is attached to the upper carriage, so as to not have any longitudinal motion, but so as to be rotatable. It carries at the front end a toothed segment $d$, with which engages a toothed segment $e$, fixed on a shaft $f$. The latter is mounted in the upper carriage and carries an arm $g$, Figs. 3 and 5. When the upper carriage, together with the gun, is turned upon the trunnions $h$, the arm $g$ will bear against a fixed stop $k$ on the carriage, whereby the toothed segment $e$ is turned to a certain extent in the direction of the arrow shown at Fig. 5. This turning is transmitted through the toothed segment $d$ to the piston-rod $c$. If the gun is turned in the contrary direction—that is to say, from an elevated position into the horizontal position or into a less-elevated position—the piston-rod will also be turned in the contrary direction, this being effected in the arrangement shown by means of a torsional spring $i$, carried by the shaft $f$.

The brake-piston carried by the piston-rod $c$ consists in the arrangement at Figs. 3 to 5 of two parts. The rear part $l$ constitutes the valve-seat and is rotatable upon the piston-rod, but cannot move longitudinally thereon. The front part $m$ of the piston, which constitutes a disk valve, can move longitudinally on the piston-rod, but cannot turn thereon. The valve-seat $l$ engages with a feather in a groove $p$ of the brake-cylinder $n$, which groove is of helical or other suitable form, as shown at Figs. 3 and 4. Fig. 3 shows the position of the parts which they assume toward the end of the recoil. The braking fluid flows in the direction of the arrow marked in front of the piston through the openings formed in the divided piston, which are in a position relative to each other corresponding to the degree of elevation. As the valve-seat $l$ in consequence of the groove-and-feather connection with the brake-cylinder will turn farther during the continuance of the recoil, an increased throttling and finally a complete closure of the openings of the disk valve of the piston will take place, such valve being, as before stated, non-rotatable. By this means the limitation of the recoil is effected. As soon as the forward motion commences the braking fluid flows back again in the direction of the arrow shown at Fig. 4 on the piston, and thereby presses the disk valve $m$ away from the seat $l$, so that the passage-openings are fully opened.

Figs. 6 to 13 show the relative movements of the disk valve and of the valve-seat and the consequent variation of the passage areas. The free openings are indicated by hatched lines. It is assumed that in Fig. 6 the recoil commences with a horizontal position of the gun. The openings of the disk valve $m$ and of the valve-seat $l$ comprise an angle of sixty degrees. In the initial position (shown at Fig. 6) the openings in the two parts coincide with each other, so that the entire opening is free for the passage of the braking fluid. During the recoil the valve-seat $l$ is turned in the above-described manner upon the piston-rod, such turning being, for example, also sixty degrees, according to the form of the groove $p$. The openings are then entirely closed, and the recoil must cease. In this case the longest recoil has been reached. This relative position of the parts of the piston is shown at Fig. 7. On the commencement of the ensuing forward motion the brake fluid passing through the openings of $l$ presses the disk valve $m$ away, and the entire area of the openings are free, as at Fig. 8. During the forward motion the valve-seat $l$ is again turned into the initial position by the groove $p$, whereby the relative positions of the openings of $l$ and $m$ are again established, as at Fig. 9. When the gun is elevated, the action takes place in an analogous manner only, as shown at Fig. 10. The disk valve $m$ is already turned by the act of elevating to a certain extent relatively to $l$. I will assume that this turning is effected through thirty degrees. In this case at the commencement of the recoil the passage-openings in $l$ are already reduced to one-half, as at Fig. 10. During the recoil the valve-seat $l$ again turns, so that the closing of the openings in this case already takes place when this rotation is effected through thirty degrees as compared with sixty degrees for the horizontal position, as shown at Fig. 11. If it be assumed that the curved groove $p$ constitutes a regular helix, then the gun recoil will have been reduced one-half with the assumed elevation. The forward motion takes place, as shown at Figs. 12 and 13, again with completely-uncovered passage-openings as the disk $m$ is moved away from the seat $l$.

With the described construction the large passage-opening formed for the running-forward motion is always the same as shown whether the gun is in horizontal position or has a greater or less degree of elevation. This is subject to certain disadvantages, inasmuch as the running-forward springs, which, for instance, with the greatest amount of elevation (in which they will have in addition to raise the gun to a certain extent) have a very efficient action, will effect the forward motion much too powerfully with a horizontal position of the gun. These disadvantages are avoided in the arrangement shown at Figs. 14 and 15 in that there is added to the divided brake-piston a third disk $o$, situated behind the valve-seat $l$ and capable of sliding upon the piston-rod, but not of turning thereon. This disk, which is also formed with passage-openings, moves away from the piston during the recoil, as shown at Fig. 14, and therefore does not affect the above-described action for the recoil, as it leaves the piston-openings perfectly free. On the other hand, at the commencement of the forward motion it is pressed against the valve-seat $l$ by the action of the braking fluid passing in the direction of the arrow, Fig. 15, while the disk valve $m$ moves away from the valve-seat in the before-described manner. As the disk $o$ cannot turn on the piston-rod $c$, it will be turned on elevating the gun to the same extent as the piston-rod and valve-disk $m$, so that on elevating the gun the passage-openings will also be regulated in respect of the forward motion. It will be seen that the conditions for the variations of the passage-openings for the forward motion are the opposite of those for the recoil—that is to say, with a high elevation the position of the gun has a favorable action with regard to the recoil, and consequently, as described, there must be effected a reduction of the passage-openings at the moment of firing. During the forward motion, on the other hand, the weight of the gun exercises a resisting action, and consequently with an elevation the passage of brake fluid through the piston must consequently be rendered more easy as compared with the horizontal position—that is to say, the sectional area of the passage-openings must be greater during the forward motion with an elevation than it is with the horizontal position. In order to effect this, the openings or controlling edges of the disk $o$ are so situated relatively to those of the disk $m$ that at the end position of the forward motion (corresponding to the initial position of the recoil) they only allow of a minimum passage-opening through the piston when the disk $m$ allows of the maximum opening. This is the case with the horizontal position of the gun. With an increasing elevation, in which in the above-described manner the disk $m$ closes the passage-openings more and more for the recoil, the disk $o$, which lies against the valve-seat $l$ during the forward motion, will uncover the passage-openings more and more. In this way therefore an approximately uniform forward motion of the gun is effected for all degrees of elevation.

Having thus described the nature of my said invention and the best means I know of carrying the same into practical effect, I claim—

1. In brake apparatus for guns recoiling upon the carriage an arrangement for automatically reducing the extent of recoil on the gun being elevated consisting of a brake-cylinder, a piston-rod, means for rotating the latter during the elevation of the gun, a piston arranged on the said piston-rod and composed of a disk valve that can slide longitudinally but cannot turn on the piston-rod and a valve-seat rotatable on the piston-rod and provided with passages for the braking fluid, a feather on the valve-seat and a groove arranged in the brake-cylinder and engaged by the said feather, substantially as described and for the purpose set forth.

2. In brake apparatus for guns recoiling upon the carriage an arrangement for automatically reducing the extent of recoil on the gun being elevated consisting of a brake-cylinder, a piston-rod, means for rotating the latter during the elevation of the gun, a piston arranged on the said piston-rod and composed of a disk valve that can slide longitudinally but cannot turn on the piston-rod and a valve-seat rotatable on the piston-rod and provided with passages for the braking fluid, a feather on the valve-seat, a groove arranged in the brake-cylinder and engaged by the said feather and means for regulating the passages of the valve-seat during the forward motion of the gun, substantially as described and for the purpose set forth.

3. In brake apparatus for guns recoiling upon the carriage an arrangement for automatically reducing the extent of recoil on the gun being elevated consisting of a brake-cylinder, a piston-rod, means for rotating the latter during the elevation of the gun, a piston arranged on the said piston-rod and composed of a disk valve that can slide longitudinally but cannot turn on the piston-rod and a valve-seat rotatable on the piston-rod and provided with passages for the braking fluid, a feather on the valve-seat, a groove arranged in the brake-cylinder and engaged by the said feather and a second disk valve that can slide longitudinally but cannot turn on the piston-rod, substantially as described and for the purpose set forth.

In witness whereof I have hereunto set my hand in presence of two witnesses.

KARL VÖLLER.

Witnesses:
 PETER LIEBER,
 WILLIAM ESSENWEIN.